(12) United States Patent
Zhou

(10) Patent No.: US 8,943,418 B2
(45) Date of Patent: Jan. 27, 2015

(54) METHOD AND DEVICE FOR DISPLAYING INFORMATION OF EMAIL

(75) Inventor: Baozhong Zhou, Huizhou (CN)

(73) Assignee: Huizhou TCL Mobile Communication Co., Ltd, Huizhou, Guangdong (CN)

(*) Notice: Subject to any disclaimer, the term of this patent is extended or adjusted under 35 U.S.C. 154(b) by 308 days.

(21) Appl. No.: 13/515,492

(22) PCT Filed: May 18, 2011

(86) PCT No.: PCT/CN2011/074269
§ 371 (c)(1),
(2), (4) Date: Jun. 12, 2012

(87) PCT Pub. No.: WO2012/024947
PCT Pub. Date: Mar. 1, 2012

(65) Prior Publication Data
US 2012/0254771 A1   Oct. 4, 2012

(30) Foreign Application Priority Data
Aug. 26, 2010   (CN) .......................... 2010 1 0265457

(51) Int. Cl.
G06F 3/00   (2006.01)
G06Q 10/10   (2012.01)
G06F 17/24   (2006.01)

(52) U.S. Cl.
CPC ............ *G06Q 10/107* (2013.01); *G06F 17/243* (2013.01); *Y10S 707/99935* (2013.01)
USPC ..... 715/752; 715/234; 709/206; 707/999.005

(58) Field of Classification Search
CPC .................................................. G06F 17/243
USPC ........................... 715/752; 709/206; 455/466
See application file for complete search history.

(56) References Cited

U.S. PATENT DOCUMENTS

| 7,698,558 | B2* | 4/2010 | Tomkow ....................... 713/176 |
| 7,953,805 | B2* | 5/2011 | Gupta et al. .................. 709/206 |
| 8,452,314 | B2* | 5/2013 | Kristiansson et al. ........ 455/466 |
| 8,713,124 | B1* | 4/2014 | Weiss ............................ 709/207 |
| 2003/0182103 | A1* | 9/2003 | Atkin ............................... 704/9 |
| 2007/0255792 | A1* | 11/2007 | Gronberg ..................... 709/206 |
| 2009/0153292 | A1* | 6/2009 | Farb ............................ 340/5.52 |
| 2009/0164455 | A1* | 6/2009 | Weinberg et al. ................ 707/5 |

(Continued)

FOREIGN PATENT DOCUMENTS

| CN | 1452058 A | 10/2003 |
| CN | 101072195 A | 11/2007 |

(Continued)

*Primary Examiner* — William Titcomb
(74) *Attorney, Agent, or Firm* — Shimokaji & Associates P.C.

(57) ABSTRACT

The invention relates to the technical field of email sending and receiving and discloses a method and device for displaying the information of an email. The method includes obtaining email display information through an email agent; invoking a text display interface; displaying the obtained display information to a user in a coded format of Unicode when the user selects the email. In the device, email display information is obtained through an email agent; a text display interface is invoked; the obtained display information is displayed to the user in a coded format of Unicode when the user selects the email. As Unicode is an important universal character coding standard for interaction and display, great convenience may be brought to email senders and receivers in different languages, as well as other users.

15 Claims, 2 Drawing Sheets

(56) References Cited

U.S. PATENT DOCUMENTS

| | | | |
|---|---|---|---|
| 2010/0216495 A1* | 8/2010 | Kristiansson et al. | 455/466 |
| 2011/0265016 A1* | 10/2011 | Koopman | 715/752 |
| 2012/0011426 A1* | 1/2012 | Yach | 715/208 |
| 2012/0011448 A1* | 1/2012 | Tse | 715/752 |
| 2012/0034938 A1* | 2/2012 | Kreitzer et al. | 455/466 |

FOREIGN PATENT DOCUMENTS

| | | |
|---|---|---|
| CN | 201286115 Y | 8/2009 |
| CN | 101937530 A | 1/2011 |

* cited by examiner

METHOD AND DEVICE FOR DISPLAYING INFORMATION OF EMAIL

TECHNICAL FIELD OF THE INVENTION

The present invention relates to the technical field of email sending and receiving, and in particular to a method and device for displaying the information of an email.

BACKGROUND OF THE INVENTION

With the continuous popularity in usage of email boxes, users have increasing requirements on functions available within email boxes.

For existing email boxes, one may be unable to modify the mailbox setup during the process of sending and receiving emails, after the display language is set. As a result, when an email is sent between different nations or areas using different languages, a language barrier may arise when the email is displayed between the addresser and the addressee.

Ways to provide a universal code and a display to bring convenience to the use of the email addresser and addressee in different languages is one of the research directions of the technical field of email sending and receiving.

SUMMARY OF THE INVENTION

An object of the present invention is to provide a method for displaying information in an email, in order to provide a universal code and a display to bring convenience to the use of the email addresser and addressee, in different languages. According to one aspect of the present invention, a method for displaying information in an email includes: obtaining email display information through an email agent; invoking a text display interface; and displaying the obtained display information to a user in a coded format of Unicode when the user selects the email.

According to another aspect of the present invention, a device for displaying the information in an email comprises an email display information obtaining module, configured to obtain email display information through an email agent; a text display interface invoking module, configured to invoke a text display interface; and a display module, configured to display the obtained display information to a user in a coded format of Unicode when the user selects the email.

In some embodiments, email display information is obtained through an email agent; a text display interface is invoked; the obtained display information is displayed to a user in a coded format of Unicode when the user selects the email. As Unicode is an important universal character coding standard for interaction and display, embodiments of the invention bring great convenience to email senders and receivers in different languages, as well as great convenience to users.

DETAILED DESCRIPTION OF THE INVENTION

To make the objects, technical solutions and advantages of the invention more clear, the invention will be further described in details below with reference to drawings and embodiments. It should be understood that specific embodiments described herein are only used for explaining the invention, instead of limiting the invention.

Figure 1:
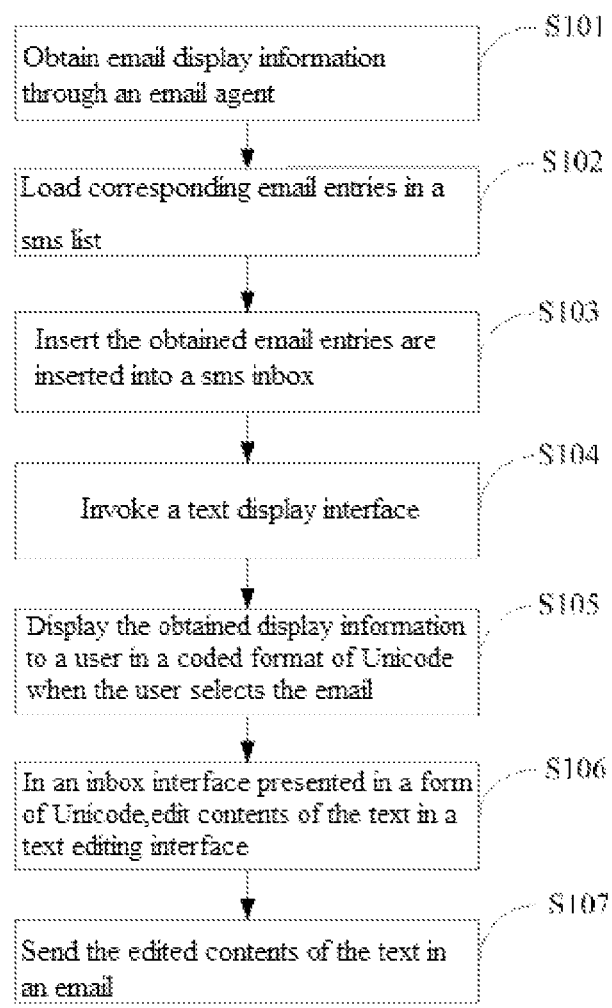
FIG. 1 is a flow chart of a method for displaying information in an email, provided in an embodiment of the present invention.

FIG. 1 illustrates a flow chart of a method for displaying information in an email, provided in an exemplary embodiment of the invention.

In step S101, email display information is obtained through an email agent;

the email display information may include, for example: an addresser (a sender), an email address of a user (a recipient), corresponding Ccs (carbon copy) recipients, a subject of the email, names of attachments attached to the email, a message body of the email, and a sending time of the email.

In step S102, email display information entries corresponding to an email are loaded in a SMS (short message system) list.

In step S103, the obtained email display information entries are inserted into a SMS inbox.

In step S104, a text display interface is invoked.

In step S105, the obtained email display information entries are displayed to the user, for example, a sender or a recipient, in a coded format of Unicode when the user selects the email.

In step S106, in the inbox interface, contents of the body, presented in Unicode, are edited in a text editing interface;

In step S107, the edited contents of the body are sent in an email.

For example, display information in an inbox under Unicode form may be displayed in fields as follows:

a. addresser:
mmi_email_read_goto_addr→mmi_email_entry_read_addr→mmi_email_read_get_a ddr_list;
A corresponding addresser is obtained by use of the email agent and displayed in a coded format of Unicode;

b. addressee:
An email box address of a user is obtained according to configuration of a current effective email profile and presented in a coded format of Unicode;

c. Ccs:
A list of corresponding Ccs recipients is obtained by use of the email agent and displayed in a coded format of Unicode;

d. subject:
A subject of the email is obtained by use of the email agent and displayed in a coded format of Unicode;

e. names of attachments in the email:
Names of attachments in the email are obtained by use of the email agent. It may be unnecessary to load attachments to the email. In an exemplary embodiment, it may suffice to display the names of attachments in a coded format of Unicode;

f. body of email:
Text forming a message body of an email is obtained by use of the email agent, and the text contents of the body are converted and displayed in a coded format of Unicode. It may be unnecessary to load other content, such as pictures, formats and tables;

g. sending time:
The sending time of the email is obtained by use of the email agent and displayed in a coded format of Unicode.

After the above information is obtained, corresponding email display information entries are loaded in a SMS list and inserted into a SMS inbox. A text display interface is invoked and the above seven fields are displayed when the user selects the email, presenting the contents of the email in Unicode text.

The process for displaying reply text may be described as follows:

A reply function is selected in the inbox. In the inbox interface (presented in text mode), information of the addressee has been obtained by the addresser. Contents of the body are edited in a text editing interface. Information required to send the email, addressee, and sending configuration are selected. The email is sent by using the primary flow mechanism.

As an important universal character coding standard for interaction and display, Unicode covers languages of America, Europe, Middle East, Africa, India, Asia and The Pacific, and ancient prose and specialized symbols. Unicode allows exchange, disposal and display of multi-language texts and public specialized and mathematic symbols. Therefore, no matter which nation the email addresser and the addressee are in, the use of the email addresser and addressee is facilitated.

Figure 2:
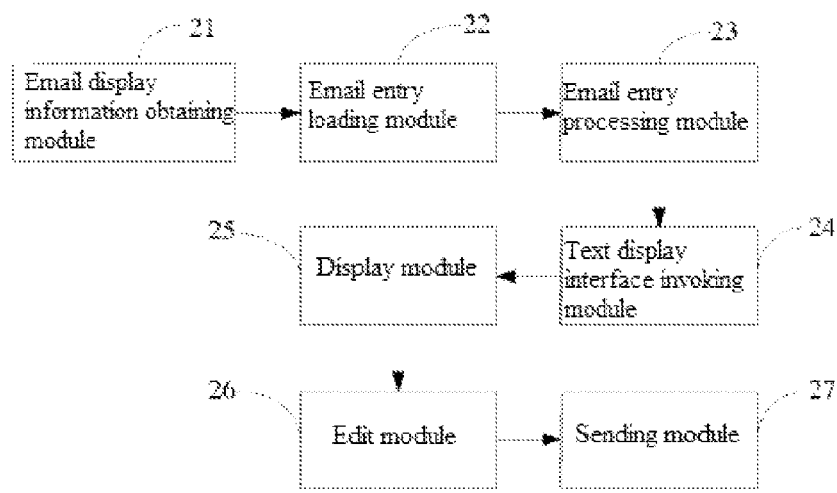
FIG. 2 is a structure diagram of a device for displaying the information in an email, provided in an embodiment of the present invention.

FIG. 2 illustrates a device for displaying information related to an email, according to an exemplary embodiment of the invention.

An email display information obtaining module 21 is configured to obtain email display information through an email agent. The email display information comprises: an addresser, an email address of a user, corresponding Ccs recipients, a subject of the email, names of attachments of the email, a message body of the email, and a sending time of the email. Email entry loading module 22 is configured to load corresponding email entries in a SMS list. Email entry processing module 23 is configured to insert the obtained email entries into a SMS inbox. Text display interface invoking module 24 is configured to invoke a text display interface. Display module 25 is configured to display the obtained display information to a user in a coded format of Unicode when the user selects the email. Edit module 26 is configured to, in an inbox interface presented in a form of Unicode, edit contents of the body in a text editing interface. Sending module 27 is configured to send the edited contents of the body in an email. In the inbox interface (presented in text mode), for the addresser, information of an addressee has been obtained. In the inbox interface, contents of the body are edited in a text editing interface; information required to send the email, the addressee and sending configuration are selected; and the email is sent by using the primary flow mechanism.

In some embodiments of the invention, email display information is obtained through an email agent; a text display interface is invoked; the obtained display information is displayed to the user in a coded format of Unicode when the user selects the email. As Unicode is an important universal character coding standard for interaction and display, embodiments of the invention bring great convenience to email senders and receivers in different languages, as well as, great convenience to users.

It should be understood that, for those skilled in the art, the invention may have modifications or alternations according to the above description, and these modifications and alternations all fall into the protection scope defined by the claims of the invention.

The invention claimed is:

1. A method for displaying information of an email, comprising:
   receiving, using an email display information obtaining module of a device, email display information through an email agent, wherein the email display information is representative of a first language and wherein the email display information includes at least one of: an addresser of the email, an email address of a recipient of the email, a corresponding copied recipient of the email, a subject of the email, names of attachments of the email, a message body of the email, or a sending time of the email;
   invoking, using a text display interface invoking module of the device, a text display interface; and
   displaying, using a display module of the device, the received email display information to a user, via the text display interface, when the user selects the email, wherein the email display information is displayed in a coded format of Unicode, wherein the coded format of Unicode is representative of a second language different than the first language, wherein at least one of the first and second languages is selected from: languages of America, languages of Europe, languages of the Middle East, languages of Africa, languages of India, languages of Asia, languages of the Pacific, ancient prose, specialized symbols, multi-language text, public specialized symbols, or mathematic symbols.

2. The method for displaying information of an email according to claim 1, wherein the email display information comprises:
   an addresser, an email address of the user, corresponding carbon copy recipients, a subject of the email, names of attachments attached to the email, a body of the email, and a sending time of the email.

3. The method for displaying information of an email according to claim 1, wherein after the step of receiving email display information through an email agent, the method further comprises:
   loading corresponding email entries into a sms list; and
   inserting the email entries into a sms inbox.

4. The method for displaying information of an email according to claim 1, wherein the method further comprises:
   in an inbox interface presented in a form of Unicode, editing contents of an email body in a text editing interface; and
   sending the edited contents of the body in another email.

5. A device for displaying information of an email, comprising:
   a device email display information obtaining module that receives email display information through an email agent, wherein the email display information is representative of a first language and wherein the email display information includes at least one of: an addresser of the email, an email address of a recipient of the email, a corresponding copied recipient of the email, a subject of the email, names of attachments of the email, a message body of the email, or a sending time of the email;
   a device text display interface invoking module that invokes a text display interface; and
   a device display module that displays the received display information to a user in a coded format of Unicode when the user selects the email, wherein the coded format of Unicode is representative of a second language different than the first language.

6. The device for displaying information of an email according to claim 5, wherein the email display information comprises:
   an addresser, email address of the user, corresponding carbon copy recipients, a subject of the email, names of attachments attached to the email, a body of the email, and a sending time of the email.

7. The device for displaying information of an email according to claim 5, wherein the device further comprises:
   an email entry loading module, configured to load corresponding email entries into a sms list; and an email entry processing module, configured to insert the email entries into a sms inbox.

8. The device for displaying information of an email according to claim 5, wherein the device further comprises:
an edit module, configured to, in an inbox interface with content presented in a form of Unicode, edit contents of an email body in a text editing interface; and
a sending module, configured to send the edited contents of the body in another email.

9. The device for displaying information of an email according to claim 5, wherein content of a body of text is presented in Unicode in the text display interface.

10. A method, comprising:
receiving, using an email display information obtaining module of a device, email display information through an email agent, wherein the email display information is representative of a first language;
invoking, using a text display interface invoking module of the device, a text display interface;
displaying, using a display module of the device, the email display information on an interface; and
providing a text editing interface operative to edit the email display information in a Unicode format, wherein the Unicode format is representative of a second language different than the first language, wherein the coded format of Unicode is representative of a second language different than the first language, wherein at least one of the first and second languages is selected from: languages of America, languages of Europe, languages of the Middle East, languages of Africa, languages of India, languages of Asia, languages of the Pacific, ancient prose, specialized symbols, multi-language text, public specialized symbols, or mathematic symbols.

11. The method of claim 10, wherein the email display information includes a message body.

12. The method of claim 10, wherein the email display information is displayed in an inbox interface.

13. The method of claim 12, wherein the text editing interface is provided in response to a reply function.

14. The method of claim 13, wherein:
the email display information includes a message body edited through the text editing interface, and
the edited message body is sent in a reply email message.

15. The method of claim 10, wherein the email display information includes the names of attachments.

* * * * *